United States Patent
Nishida et al.

(10) Patent No.: US 8,394,306 B2
(45) Date of Patent: Mar. 12, 2013

(54) METHOD FOR PRODUCING MICROPOROUS THERMOPLASTIC RESIN MEMBRANE

(75) Inventors: Mitsuhiro Nishida, Kanagawa-ken (JP); Kohtaro Kimishima, Kanagawa-ken (JP); Sadakatsu Suzuki, Saitama-ken (JP)

(73) Assignee: Toray Battery Separator Film Co., Ltd., Tochigi (JP)

( * ) Notice: Subject to any disclaimer, the term of this patent is extended or adjusted under 35 U.S.C. 154(b) by 392 days.

(21) Appl. No.: 10/311,806

(22) PCT Filed: Jun. 28, 2001

(86) PCT No.: PCT/JP01/05575
§ 371 (c)(1),
(2), (4) Date: Dec. 20, 2002

(87) PCT Pub. No.: WO02/02678
PCT Pub. Date: Jan. 10, 2002

(65) Prior Publication Data
US 2003/0168764 A1    Sep. 11, 2003

(30) Foreign Application Priority Data

Jun. 30, 2000  (JP) .................................. 2000-199860
Jun. 30, 2000  (JP) .................................. 2000-199861

(51) Int. Cl.
*D06M 13/00* (2006.01)
*B29C 47/88* (2006.01)
*B29C 55/00* (2006.01)
*B29C 65/00* (2006.01)

(52) U.S. Cl. ................... 264/210.4; 264/41; 264/178 R; 264/203; 264/210.3; 264/210.5; 264/210.7; 264/216; 264/211.19; 264/233; 264/237; 264/290.2; 264/344

(58) Field of Classification Search ............ 264/14, 264/233, 210.4, 178 R
See application file for complete search history.

(56) References Cited

U.S. PATENT DOCUMENTS

| | | | | |
|---|---|---|---|---|
| 3,691,264 A | * | 9/1972 | Asahina et al. | 264/436 |
| 5,786,396 A | * | 7/1998 | Takita et al. | 521/64 |
| 5,853,633 A | * | 12/1998 | Kono et al. | 264/54 |
| 6,008,179 A | * | 12/1999 | Flynn et al. | 510/411 |
| 6,355,113 B1 | * | 3/2002 | Nalewajek et al. | 134/26 |
| 2005/0098913 A1 | * | 5/2005 | Funaoka et al. | 264/41 |

FOREIGN PATENT DOCUMENTS

| | | |
|---|---|---|
| EP | 0 765 900 A | 4/1997 |
| EP | 0 947 545 A | 10/1999 |
| GB | 1 486 867 A | 9/1977 |
| JP | 06-256559 | 9/1994 |
| JP | 06-298985 | 10/1994 |
| WO | 9921914 | 5/1999 |

OTHER PUBLICATIONS

Japanese Office Action dated Sep. 8, 2010, (Application No. 2000-199860).
Japanese Office Action dated Sep. 8, 2010, (Application No. 2000-199861).

* cited by examiner

*Primary Examiner* — Jeffrey Wollschlager
(74) *Attorney, Agent, or Firm* — Sughrue Mion, PLLC

(57) ABSTRACT

A method for producing a thermoplastic resin micro-porous film wherein a thermoplastic resin and a solvent (A) are melted and kneaded together to prepare a solution, the solution is extruded and cooled to prepare a formed product in a gel state, and the residual solvent (A) is removed from the formed product, characterized in that in the step of removing the solvent (A) use is made of a non-aqueous solvent (B) which is compatible with the solvent (A) and not compatible with the thermoplastic resin, and has a boiling point of 100° or higher and a flashing point of 0° or higher. The use of the non-aqueous solvent (B) provides a production method which allows the removal of a solvent with good efficiency and also with the reduction of a fear of environmental pollution and catching fire.

18 Claims, No Drawings

METHOD FOR PRODUCING MICROPOROUS THERMOPLASTIC RESIN MEMBRANE

FIELD OF THE INVENTION

The present invention relates to a method for producing a microporous thermoplastic resin membrane, particularly to a method for producing a microporous thermoplastic resin membrane with reduced likelihood of environmental pollution, and ignition and explosion in a drying process.

BACKGROUND OF THE INVENTION

Microporous thermoplastic resin membranes are widely used in various applications such as battery separators, electrolytic capacitor separators, various filters, moisture-permeable, waterproof clothes, reverse osmosis membranes, ultrafiltration membranes, microfiltration membranes.

The production of microporous thermoplastic resin membranes are carried out by a wet method, a dry method, a pore-forming stretching method, etc., and the wet method is widely used among them. The wet method comprises the steps of adding a solvent to a thermoplastic resin, melt-blending the resultant mixture, and removing the solvent, and the efficiency of this solvent-removing step has influence on the productivity and mechanical properties of the microporous thermoplastic resin membranes. Conventionally used in the solvent-removing step are chlorinated alkanes having low boiling points such as methylene chloride and aliphatic hydrocarbon compounds having low boiling points such as hexane. Though low-boiling-point, chlorinated alkanes are advantageous in high detergency and easy drying, their use is going to be regulated because of environmental pollution. The low-boiling-point aliphatic hydrocarbon compounds are highly likely to ignite and explode during a drying process, and easily evaporated into the air. Therefore, regulations for preventing their discharge are enforced in some prefectures.

On the other hand, for instance, JP 6-256559 A and JP 6-298985 A propose aqueous surfactant solutions, and mixed solvents of organic solvents and water, respectively, as inflammable substitute solvents. However, such aqueous or semi-aqueous solvents do not necessarily have sufficient cleansing power to solvents added to thermoplastic resins.

OBJECT OF THE INVENTION

Accordingly, an object of the present invention is to provide a method for producing a microporous thermoplastic resin membrane, using a substitute solvent, which has reduced load to environment, is easily removable, and is less likely to ignite and explode during a drying step.

DISCLOSURE OF THE INVENTION

As a result of intense research in view of the above object, the inventors have found that the above object can be achieved by using a nonaqueous solvent (B) having a boiling point of 100° C. or higher and a flash point of 0° C. or higher, in the removal of a solvent (A) remaining in a gel-like molding, which is formed by extruding and cooling a melt-blended solution of a thermoplastic resin and a solvent (A). The present invention has been accomplished based on this finding.

Thus, the method for producing a microporous thermoplastic resin membrane according to the present invention comprises the steps of extruding a solution obtained by melt-blending a thermoplastic resin and a solvent (A), cooling the resultant extrudate to form a gel-like product, and cleansing said gel-like product to remove said solvent (A) remaining therein, wherein a nonaqueous solvent (B) having a boiling point of 100° C. or higher and a flash point of 0° C. or higher is used in the removal of said solvent (A). This provides a production method capable of removing a solvent efficiently with suppressed likelihood of causing an environmental pollution, and ignition and explosion during a drying step.

In order that the microporous polyolefin membrane has better properties, the thermoplastic resin preferably meets the following conditions (1) to (5):

(1) Thermoplastic resin is at least one selected from the group consisting of polyolefins, polyesters, polyamides and polyallylene sulfides. These thermoplastic resins may be used alone or with two or more of them combined. Among these resins, polyolefins are more preferable.

(2) Polyolefin recited in (1) above is at least one resin selected from the group consisting of polyethylene, polypropylene and polybutene-1, more preferably polyethylene and/or polypropylene.

(3) Polyolefin recited in (1) and (2) above has a weight-average molecular weight of $5 \times 10^5$ or more, more preferably $1 \times 10^6$ to $15 \times 10^6$. The thermoplastic resin is preferably a composition comprising polyolefin having the above weight-average molecular weight, more preferably a composition of ultra-high-molecular-weight polyethylene having a weight-average molecular weight of $5 \times 10^5$ or more and high-density polyethylene having a weight-average molecular weight of $1 \times 10^4$ or more and less than $5 \times 10^5$.

(4) The polyolefin recited in (1) to (3) above or the polyolefin composition recited in (3) above has a ratio of weight-average molecular weight/number-average molecular weight (Mw/Mn) of 5 to 300.

(5) The polyolefin composition recited in (3) or (4) above comprises ultra-high-molecular-weight polyethylene having a weight-average molecular weight of $5 \times 10^5$ or more, high-density polyethylene having a weight-average molecular weight of $1 \times 10^4$ or more and less than $5 \times 10^5$, and a polyolefin for providing a shutdown function, which causes the microporous membrane to melt to clog fine pores thereby shutting down electric current to prevent incidents such as ignition, etc. during temperature elevation in a battery. The polyolefin for providing the above shutdown function is at least one selected from the group consisting of low-density polyethylene, linear low-density polyethylene, low-molecular-weight polyethylene having a molecular weight of $1 \times 10^3$ to $4 \times 10^3$ and an ethylene/α-olefin copolymer produced using a single-site catalyst.

In order that the microporous polyolefin membrane has better properties, the nonaqueous solvent (B) preferably meets the following conditions (6) to (17):

(6) At least one selected from the group consisting of n-paraffins having 8 or more carbon atoms; n-paraffins having 5 or more carbon atoms, at least part of whose hydrogen atoms is substituted by an halogen atom; isoparaffin having 8 or more carbon atoms; cycloparaffin having 7 or more carbon atoms; cycloparaffin having 5 or more carbon atoms, at least part of whose hydrogen atoms is substituted by an halogen atom; aromatic hydrocarbon having 7 or more carbon atoms; aromatic hydrocarbon having 6 or more carbon atoms, at least part of whose hydrogen atoms is substituted by an halogen atom; alcohols having 5 to 10 carbon atoms, at least part of whose hydrogen atoms may be substituted by an halogen atom; esters and ethers having 7 to 14 carbon atoms, at least part of whose hydrogen atoms may be substituted by an halogen atom; and ketones having 5 to 10 carbon atoms.

(7) The above n-paraffins preferably have 8 to 12 carbon atoms, more preferably selected from the group consisting of n-octane, n-nonane, n-decane, n-undecane and n-dodecane.

(8) The above n-paraffin having 5 or more carbon atoms, at least part of whose hydrogen atoms are substituted by halogen atoms, is at least one selected from the group consisting of 1-chloropentane, 1-chlorohexane, 1-chloroheptane, 1-chlorooctane, 1-bromopentane, 1-bromohexane, 1-bromoheptane, 1-bromooctane, 1,5-dichloropentane, 1,6-dichlorohexane and 1,7-dichloroheptane.

(9) The above isoparaffin having 8 or more carbon atoms is selected from the group consisting of 2,3,4-trimethylpentane, 2,2,3-trimethylpentane, 2,2,5-trimethylhexane, 2,3,5-trimethylhexane, 2,3,5-trimethylheptane and 2,5,6-trimethyloctane.

(10) The above cycloparaffin having 7 or more carbon atoms is selected from the group consisting of cycloheptane, cyclooctane, methylcyclohexane, cis-1,2-dimethylcyclohexane, trans-1,2-dimethylcyclohexane, cis-1,3-dimethylcyclohexane, trans-1,3-dimethylcyclohexane, cis-1,4-dimethylcyclohexane and trans-1,4-dimethylcyclohexane.

(11) The above cycloparaffin having 5 or more carbon atoms, part of whose hydrogen atoms are substituted by halogen atoms, is at least one selected from the group consisting of chlorocyclopentane and chlorocyclohexane.

(12) The above aromatic hydrocarbon having 7 or more carbon atoms is selected from the group consisting of toluene, o-xylene, m-xylene and p-xylene.

(13) The above aromatic hydrocarbon having 6 or more carbon atoms, part of whose hydrogen atoms are substituted by halogen atoms, is at least one selected from the group consisting of chlorobenzene, 2-chlorotoluene, 3-chlorotoluene, 4-chlorotoluene, 3-chloro-o-xylene, 4-chloro-o-xylene, 2-chloro-m-xylene, 4-chloro-m-xylene, 5-chloro-m-xylene and 2-chloro-p-xylene.

(14) The above alcohol having 5 to 10 carbon atoms, part of whose hydrogen atoms may be substituted by halogen atoms, is at least one selected from the group consisting of isopentyl alcohol, t-pentyl alcohol, cyclopentanol, cyclohexanol, 3-methoxy-1-butanol, 3-methoxy-3-methyl-1-butanol, propylene glycol n-butyl ether and 5-chloro-1-pentanol.

(15) The above ester having 7 to 14 carbon atoms, part of whose hydrogen atoms may be substituted by halogen atoms, is at least one selected from the group consisting of diethyl carbonate, diethyl maleate, n-propylacetate, n-butyl acetate, isopentyl acetate, 3-methoxybutyl acetate, 3-methoxy-3-methylbutyl acetate, n-ethyl butylate, n-ethyl valerate and 2-chloroethyl acetate.

(16) The above ether having 7 to 14 carbon atoms, part of whose hydrogen atoms may be substituted by halogen atoms, is at least one selected from the group consisting of n-butyl ether, diisobutyl ether and bis(chloroethyl)ether.

(17) The above ketone having 5 to 10 carbon atoms is selected from the group consisting of 2-pentanone, 3-pentanone, 2-hexanon, 3-hexanon, cyclopentanone and cyclohexanone.

The above nonaqueous solvent (B) is preferably mixed with, as an optional component (B'), at least one solvent selected from the group consisting of linear hydrofluorocarbon represented by the formula such as $C_5H_2F_{10}$, hydrofluoroether represented by the formulae such as $C_4F_9OCH_3$ and $C_4F_9OC_2H_5$, and cyclic hydrofluorocarbon represented by the formula such as $C_5H_3F_7$.

The solvent (A) is removed by two or more cleansing steps, and at least one step among the cleansing steps preferably uses a nonaqueous solvent (B) to remove the solvent (A) sufficiently. The two or more cleansing steps are usually two to five steps, preferably two to three steps. In this case, the nonaqueous solvent (B) may, of course, be used at all steps, but a solvent (C) causing no depletion of an ozone layer and having a boiling point of 100° C. or lower is used preferably in at least final step after treatment with the nonaqueous solvent (B). By using the solvent (C) causing no depletion of an ozone layer and having a boiling point of 100° C. or lower in the final step, the removal of the solvent (A) can be carried out more effectively, to improve the efficiency of a drying step, and reduce the load of the production steps on environment.

In order that the microporous polyolefin membrane has better properties, the solvent (C) preferably meets the following conditions (18) to (20).

(18) At least one selected from the group consisting of alcohols having 3 or 4 carbon atoms; mixtures of alcohol having carbon atoms 1 to 4 and water; linear hydrofluorocarbons represented by the formula of $C_5H_2F_{10}$, etc.; hydrofluoroethers represented by the formula of $C_4F_9OCH_3$ and $C_4F_9OC_2H_5$, etc.; and cyclic hydrofluorocarbons represented by the formula of $C_5H_3F_7$, etc.

(19) Alcohols having 3 or 4 carbon atoms recited in (18) above are at least one selected from the group consisting of n-propanol, isopropanol, s-butanol and t-butanol.

(20) Alcohols used in mixtures of alcohols having 1 to 4 carbon atoms and water recited in (18) above are at least one selected from the group consisting of methanol, ethanol, n-propanol, isopropanol, s-butanol and t-butanol.

BEST MODE FOR CARRYING OUT THE INVENTION

[1] Thermoplastic Resins

Used as thermoplastic resins for producing the microporous thermoplastic resin membrane according to the present invention are preferably polyolefins, polyesters, polyamides or polyallylene sulfides, more preferably polyolefins.

Polyolefins preferably have a weight-average molecular weight of $5 \times 10^5$ or more, more preferably $1 \times 10^6$ to $15 \times 10^6$. When the weight-average molecular weight is less than $5 \times 10^5$, the resultant microporous membranes are likely to be broken at the time of stretching, resulting in difficulty in obtaining suitable microporous membranes.

Preferable as a polyolefin is an ultra-high-molecular-weight polyethylene having a weight-average molecular weight of $5 \times 10^5$ or more. Such ultra-high-molecular-weight polyethylene may be an ethylene homopolymer or a copolymer comprising a small amount of other α-olefins. Preferable examples of the other α-olefins than ethylene include propylene, butene-1, hexene-1, pentene-1,4-methylpentene-1, octene, vinyl acetate, methyl methacrylate and styrene.

A polyolefin composition comprising a polyolefin having a weight-average molecular weight of $5 \times 10^5$ may be used as a thermoplastic resin. The polyolefin composition preferably comprises a polyolefin having a weight-average molecular weight of $5 \times 10^5$ or more and a polyolefin having a weight-average molecular weight of $1 \times 10^4$ or more and less than $5 \times 10^5$. When no polyolefin having a weight-average molecular weight of less than $5 \times 10^5$ is used as a component of the polyolefin composition, the extruded polyolefin solution is often broken when stretched, failing to obtain a good microporous membrane. The upper limit of the weight-average molecular weight of the polyolefin and its composition is $15 \times 10^6$ so that melt-extrusion can easily be carried out.

Preferable as a polyolefin having a weight-average molecular weight of $5 \times 10^5$ or more in the polyolefin composition is an ultra-high-molecular-weight polyethylene, which may be a copolymer containing small amounts of other α-olefins.

Also preferable as a polyolefin in the polyolefin composition is polyethylene having a weight-average molecular weight of $1 \times 10^4$ or more and less than $5 \times 10^5$. The polyethylene is preferably high-density polyethylene, low-density polyethylene, medium-density polyethylene, ultra-high-molecular-weight polyethylene, more preferably high-density polyethylene. They may be homopolymers of ethylene or ethylene copolymers comprising small amounts of other α-olefins. Preferred examples of the other α-olefins than ethylene include propylene, butene-1, hexene-1, pentene-1,4-methyl pentene-1, octene, vinyl acetate, methyl methacrylate and styrene.

When used for battery separators, it is preferable to add polypropylene to improve their melt-down temperatures (breakage temperatures of the microporous thermoplastic membranes). Polypropylene used may not only be homopolymers but also block copolymers and/or random copolymers. The block copolymers and the random copolymers may contain copolymer components of propylene and other α-olefins, and the other α-olefin is preferably ethylene.

To improve properties for battery separators, the above-described low-density polyethylene may be used as polyolefins for providing a shutdown function. The low-density polyethylene is preferably at least one selected from the group consisting of branched low-density polyethylene (LDPE), straight low-density polyethylene(LLDPE), and an ethylene/α-olefin copolymer prepared by using a single-site catalyst. Also, low-molecular-weight polyethylene having a weight-average molecular weight of $1 \times 10^3$ to $4 \times 10^3$ may be added as polyolefins for providing a shutdown function. However, because such low-molecular-weight polyethylene is added in too many an amount, the resultant membrane is easily broken by stretching. Accordingly, the amount of such low-molecular-weight polyethylene is preferably 20 parts by weight or less based on total amount (100 parts by weight) of the thermoplastic resin.

The Mw/Mn of the above-mentioned polyolefin and polyolefin composition is preferably 5 to 300, more preferably 10 to 100. When the Mw/Mn is less than 5, high-molecular-weight components are contained in too many amounts, resulting in difficulty in melt-extrusion. On the other hand, when the Mw/Mn exceeds 300, low-molecular-weight components are contained in too many amounts, resulting in decrease in strength.

[2] Method for Producing Microporous Thermoplastic Resin Membrane

The production method of the microporous thermoplastic resin membrane of the present invention comprises the steps of (a) melt-blending the above thermoplastic resin with a solvent to prepare a thermoplastic resin solution, (b) extruding the thermoplastic resin solution through a die lip and cooling it to form a gel-like product, (c) removing the solvent from the gel-like molding, and (d) drying the resultant membrane. It may further comprise, if necessary, the steps of (e) a cross-linking treatment by the irradiation of ionized rays, (f) a heat treatment, (g) a treatment for providing the membrane with hydrophilic properties, etc., after the steps (a) to (d).

(a) Preparation of Thermoplastic Resin Solution

At first, the thermoplastic resin is first melt-blended with a suitable solvent (A) to prepare a thermoplastic resin solution. The thermoplastic resin solution may further contain, if necessary, various additives such as antioxidants, ultraviolet absorbers, anti-blocking agents, pigments, dyes, inorganic fillers, etc. in such amounts as not to affect the effects of the present invention. For instance, fine silica powder may be added as a pore-forming agent.

The solvent (A) is an organic solvent such as an aliphatic or alicyclic hydrocarbon such as nonane, decane, decalin, p-xylene, undecane, dodecane, liquid paraffin; and a mineral oil distillate having a boiling point comparable to those of the above hydrocarbons. To obtain the gel-like molding (gel-like sheet) having a stable solvent content, it is preferable to use a non-volatile organic solvent such as liquid paraffin.

The viscosity of the solvent (A) is preferably 30-500 cSt, more preferably 50-200 cSt at 25° C. When the viscosity of the solvent (A) is less than 30 cSt at 25° C., extrusion through a die lip is not uniform, resulting in difficulty in blending. On the other hand, when the solvent (A) has a viscosity higher than 500 cSt, it cannot easily be removed.

Though the melt-blending method is not particularly limited, it is generally carried out by uniform melt-blending in an extruder. This method is suitable for preparing a highly concentrated thermoplastic resin solution. The melt-blending temperature is preferably between the melting temperature of the thermoplastic resin +30° C. and the melting temperature of the thermoplastic resin +100° C., namely, 160 to 230° C., more preferably 170 to 200° C. The melting point is obtained by a differential scanning calorimetry (DSC) according to JIS K7121. Though the solvent (A) may be added before the start of blending, or to an extruder at an intermediate point during blending, it is preferable that the solvent (A) is added before the start of blending to form a solution. In the melt-blending, it is preferable to add an antioxidant to prevent the oxidation of the thermoplastic resin.

In the thermoplastic resin solution, the mixing ratio of the thermoplastic resin and the solvent (A) is such that the thermoplastic resin is 1 to 50% by weight, preferably 20 to 40% by weight, based on the total amount of the thermoplastic resin and the solvent (A). When the thermoplastic resin is less than 1% by weight, large swelling and neck-in occur at the die exit during the formation of the gel-like molding, resulting in decrease in the formability and self-support of the gel-like molding (gel-like sheet). On the other hand, when the thermoplastic resin is more than 50% by weight, the formability of the gel-like sheet is deteriorated.

(b) Formation of Gel-Like Product

The thermoplastic resin solution melt-blended in the extruder is extruded through a die lip directly or via another extruder, or via another extruder after once cooled and pelletized. The die lip used is usually a sheet die having a rectangular-cross-section orifice, though a double-cylindrical hollow die lip having a circular orifice, an inflation die lip, etc. may also be used. In the case of the sheet die, its die gap is usually 0.1 to 5 mm, and it is heated at 140-250° C. during extrusion. The extrusion speed of the heated solution is preferably 0.2 to 15 m/minute.

The heated solution extruded through the die lip is formed into the gel-like molding by cooling. Cooling is preferably conducted at least to a gelation temperature or lower at a speed of 50° C./minute or more. Generally, the slower cooling speed provides the gel-like molding with a coarser higher-order structure, resulting in large pseudo-cell units that form the structure. On the other hand, the higher cooling speed results in denser cell units. The cooling speed less than 50° C./minute results in increased crystallinity, making it unlikely to provide a gel-like product with suitable stretchability. Usable as the cooling method are a method of bringing the gel-like molding into direct contact with cooling air, cooling water and other cooling media, a method of bringing into the gel-like molding contact with a roll cooled by a coolant, etc.

(c) Stretching of Gel-Like Product and Removing of Solvent Therefrom

The gel-like molding is stretched if necessary, depending on the applications of the microporous membrane. The stretching if any is carried out usually by a tenter method, a roll method, an inflation method, a rolling method or a combination thereof to a predetermined magnification after heating the gel-like molding. Though the stretching may be either monoaxial stretching or biaxial stretching, the biaxial stretching is preferable. In the case of the biaxial stretching, it may be simultaneous or sequential stretching in longitudinal and transverse directions, and simultaneous biaxial stretching is particularly preferable. The stretching improves the mechanical strength of the membrane.

Though the stretching magnification may change depending on the thickness of the gel-like molding, it is preferably twice or more, more preferably 3 to 30 times, in monoaxial stretching. The stretching magnification in biaxial stretching is preferably at least twice or more in any directions and 10 times or more by area magnification, more preferably 15 to 400 times. When the area magnification is less than 10 times, there is insufficient stretching, failing to obtain a high-elasticity, high-strength microporous thermoplastic resin membrane. On the other hand, when the area magnification exceeds 400 times, there arise restrictions in a stretching apparatus, a stretching operation, etc.

The stretching temperature is preferably the melting point of the thermoplastic resin +10° C. or lower, more preferably in a range between the crystalline dispersion temperature and under the crystalline melting point. When the stretching temperature is higher than the melting point +10° C., the orientation of molecular chains does not take place by stretching because the resin melts. On the other hand, when the stretching temperature is lower than the crystal dispersion temperature, the softening of the resin is so insufficient that the membrane is likely to be broken by stretching, failing to achieve high-magnification stretching. In the present invention, the stretching temperature is usually 100° C. to 140° C., preferably 110° C. to 120° C. The crystal dispersion temperature is determined by the measurement of temperature characteristics of dynamic viscoelasticity according to ASTM D 4065. When the stretching is carried out, the removal of the solvent (A) can be carried out before and/or after stretching, though it is preferably after stretching.

In the removal of the solvent (A), it is necessary to use a nonaqueous solvent (B) having a boiling point of 100° C. or higher and a flash point of 0° C. or higher. The flash point of the nonaqueous solvent (B) is preferably 5° C. or higher, more preferably 40° C. or higher. Because the nonaqueous solvent (B) is less volatile, it has a low load to environment and is less likely to be ignited and exploded in a drying step. Thus, the nonaqueous solvent (B) is safe for use. Also, because it has a high boiling point, it is easily condensed, resulting in ease to recover and thus being easily recyclable. Incidentally, the "boiling point" used herein is a boiling point at $1.01 \times 10^5$ Pa, and the "flash point" is measured according to JIS K 2265.

Preferably usable as the nonaqueous solvent (B) is a solvent having compatibility with the solvent (A) and no compatibility with the thermoplastic resin. However, it is not preferable that the nonaqueous solvent (B) is an aqueous solution, because the solvent (A) cannot be sufficiently removed.

The nonaqueous solvents (B) may be, for instance, paraffinic hydrocarbons, aromatic hydrocarbons, alcohols, esters, ethers, ketones, etc., each having a boiling point of 100° C. or higher and a flash point of 0° C. or higher, and those having better compatibility with the solvent (A) are more preferable because of higher efficiency of removing the solvent (A). Preferable is, for instance, at least one selected from the group consisting of n-paraffins having 8 or more carbon atoms; n-paraffins having 5 or more carbon atoms, at least part of whose hydrogen atoms are substituted by halogen atoms; isoparaffins having 8 or more carbon atoms; cycloparaffins having 7 or more carbon atoms; cycloparaffins having 5 or more carbon atoms, at least part of whose hydrogen atoms are substituted by halogen atoms; aromatic hydrocarbons having 7 or more carbon atoms; aromatic hydrocarbons having 6 or more carbon atoms, at least part of whose hydrogen atoms are substituted by halogen atoms; alcohols having 5 to 10 carbon atoms, part of whose hydrogen atoms may be substituted by halogen atoms; esters and ethers having 7 to 14 carbon atoms, part of whose hydrogen atoms may be substituted by halogen atoms; and ketones having 5 to 10 carbon atoms.

n-Paraffins having 8 or more carbon atoms are preferably n-octane, n-nonane, n-decane, n-undecane or n-dodecane, more preferably n-octane, n-nonane or n-decane.

n-Paraffins having 5 or more carbon atoms, at least part of whose hydrogen atoms are substituted by halogen atoms, are preferably 1-chloropentane, 1-chlorohexane, 1-chloroheptane, 1-chlorooctane, 1-bromopentane, 1-bromohexane, 1-bromoheptane, 1-bromooctane, 1,5-dichloropentane, 1,6-dichlorohexane or 1,7-dichloroheptane, more preferably 1-chloropentane, 1-chlorohexane, 1-bromopentane or 1-bromohexane.

Isoparaffins having 8 or more carbon atoms are preferably 2,3,4-trimethylpentane, 2,2,3-trimethylpentane, 2,2,5-trimethylhexane, 2,3,5-trimethylhexane, 2,3,5-trimethylheptane or 2,5,6-trimethyloctane, more preferably 2,3,4-trimethylpentane, 2,2,3-trimethylpentane, 2,2,5-trimethylhexane or 2,3,5-trimethylhexane.

Cycloparaffins having 7 or more carbon atoms are preferably cycloheptane, cyclooctane, methylcyclohexane, cis-1,2-dimethylcyclohexane, trans-1,2-dimethylcyclohexane, cis-1,3-dimethylcyclohexane, trans-1,3-dimethylcyclohexane, cis-1,4-dimethylcyclohexane or trans-1,4-dimethylcyclohexane, more preferably cyclohexane.

Cycloparaffins having 5 or more carbon atoms, at least part of whose hydrogen atoms are substituted by halogen atoms, are preferably chlorocyclopentane or chlorocyclohexane, more preferably chlorocyclopentane.

Aromatic hydrocarbons having 7 or more carbon atoms are preferably toluene, ortho-xylene, meta-xylene or para-xylene, more preferably toluene.

Aromatic hydrocarbons having 6 or more carbon atoms, at least part of whose hydrogen atoms are substituted by halogen atoms, are preferably chlorobenzene, 2-chlorotoluene, 3-chlorotoluene, 4-chlorotoluene, 3-chloro-ortho-xylene, 4-chloro-ortho-xylene, 2-chloro-meta-xylene, 4-chloro-meta-xylene, 5-chloro-meta-xylene or 2-chloro-para-xylene, more preferably chlorobenzene, 2-chlorotoluene, 3-chlorotoluene or 4-chlorotoluene.

Alcohols having 5 to 10 carbon atoms, part of whose hydrogen atoms may be substituted by halogen atoms, are preferably isopentyl alcohol, t-pentyl alcohol, cyclopentanol, cyclohexanol, 3-methoxy-1-butanol, 3-methoxy-3-methyl-1-butanol, propylene glycol n-butyl ether or 5-chloro-1-pentanol, more preferably 3-methoxy-1-butanol, 3-methoxy-3-methyl-1-butanol, propylene glycol n-butyl ether or 5-chloro-1-pentanol.

Esters having 7 to 14 carbon atoms, part of whose hydrogen atoms may be substituted by halogen atoms, are preferably diethyl carbonate, diethyl maleate, n-propylacetate, n-butyl acetate, isopentyl acetate, 3-methoxybutyl acetate, 3-methoxy-3-methylbutyl acetate, n-ethyl butylate, n-ethyl valerate or 2-chloroethyl acetate, more preferably isopentyl acetate, 3-methoxybutyl acetate, 3-methoxy-3-methylbutyl acetate, n-ethyl butylate or 2-chloroethyl acetate.

Ethers having 7 to 14 carbon atoms, part of whose hydrogen atoms may be substituted by halogen atoms, are preferably dipropylene glycol dimethylether, n-butyl ether, diisobutyl ether or bis(chloroethyl)ether, more preferably dipropylene glycol dimethylether or bis(chloroethyl)ether.

Ketones having 5 to 10 carbon atoms is preferably 2-pentanone, 3-pentanone, 2-hexanon, 3-hexanon, cyclopentanone or cyclohexanone, more preferably 2-pentanone or 3-pentanone.

Though the above-described nonaqueous solvents (B) may be used in combination, it is preferable that the nonaqueous solvent (B) is further mixed with at least one solvent selected from the group consisting of linear hydrofluorocarbons represented by the formula of $C_5H_2F_{10}$, etc., hydrofluoroethers represented by the formula of $C_4F_9OCH_3$ and $C_4F_9OC_2H_5$, etc., and cyclic hydrofluorocarbons represented by the formula of $C_5H_3F_7$, etc., as an optional component (B'). In this case, the percentage of the optional components (B') is 2 to 98 parts by weight, preferably 5 to 50 parts by weight, per 100 parts by weight of a mixed solvent of the nonaqueous solvent (B) and the optional components (B').

Washing may be carried out by a method of extracting by immersion in a nonaqueous solvent (B), a method of spraying a nonaqueous solvent (B), or a combination thereof. It is preferable to use the nonaqueous solvent (B) in an amount of 300 to 30,000 parts by weight per 100 parts by weight of the gel-like molding.

The cleansing temperature depends on the boiling point of the nonaqueous solvent (B). When the boiling point of the nonaqueous solvent (B) is 100 to 150° C., cleansing can be carried out at room temperature, and if necessary, cleansing may be conducted while heating, and cleansing is generally preferable at 20 to 80° C. On the other hand, when the boiling point of the nonaqueous solvent (B) is 150° C. or higher, the penetration of the nonaqueous solvent (B) into the membrane is insufficient at room temperature, making it preferable to carry out cleansing while heating. The cleansing is preferably carried out until the amount of the remaining solvent (A) reaches less than 1% by weight of that originally added.

In the present invention, it is preferable that the solvent (A) is removed by two or more cleansing steps, and that the nonaqueous solvent (B) is preferably used in at least one step among the above cleansing steps. Though the nonaqueous solvent (B) may of course be used in all steps, it is preferable to treat the membrane with a solvent (C) different from the solvent (A) and the nonaqueous solvent (B) after treatment with the nonaqueous solvent (B). The solvent different from the solvent (A) and the nonaqueous solvent (B) means a solvent except for the solvent (A) and the nonaqueous solvent (B) used in the production steps of the microporous membrane. The preferred solvent (C) has compatibility with the nonaqueous solvent (B) and no compatibility with the thermoplastic resin, causing no depletion of an ozone layer and having a boiling point of 100° C. or lower. Particularly by using the solvent (C) causing no depletion of an ozone layer and having a boiling point of 100° C. or lower in the final step, the removal of the solvent (A) can be carried out more effectively, resulting in improvement in efficiency in the drying step and decrease in load to environment in the production steps. Accordingly, in two or more steps of removing the solvent (A), it is preferable to use the nonaqueous solvent (B) at least in the first step, and to treat the membrane with the above-described solvent (C) at least in the final step.

The cleansing steps of removing the solvent (A) are not particularly limited as long as they are two steps or more, and they usually consist of two to five steps, preferably two to three steps. Because treatment with the same solvent in each step simply elongates production steps, and enlarges a space for a facility for producing a microporous thermoplastic resin membrane, with reduced solvent-removing efficiency, it is preferable to use different solvents in respective steps, though not limited to the use of different solvents. Accordingly, in the case of a three-step cleansing treatment, for instance, the first step and the second step use the same nonaqueous solvent (B), and the third step uses different nonaqueous solvent (B) or solvent (C).

Particularly when a solvent having a boiling point of 150° C. or higher is used as the nonaqueous solvent (B), it takes too much time in drying simply with a hot air, making it likely to reduce a porosity and a permeability in a subsequent heat treatment. Thus, it is preferable to add a treatment with a solvent (C).

The preferred solvent (C) is at least one compound selected from the group consisting of alcohols having 3 or 4 carbon atoms; mixtures of alcohols having carbon atoms 1 to 4 and water; linear hydrofluorocarbons represented by the formula of $C_5H_2F_{10}$, etc.; hydrofluoroethers represented by the formula of $C_4F_9OCH_3$ and $C_4F_9OC_2H_5$, etc.; and cyclic hydrofluorocarbons represented by the formula of $C_5H_3F_7$, etc.

The alcohols having 3 or 4 carbon atoms are preferably n-propanol, isopropanol, s-butanol or t-butanol, more preferably n-propanol or isopropanol.

The mixtures of alcohols having carbon atoms 1 to 4 and water are preferably a mixture of methanol and water, a mixture of ethanol and water, a mixture of n-propanol and water, a mixture of isopropanol and water, a mixture of s-butanol and water, and a mixture of t-butanol and water, more preferably a mixture of n-propanol and water, or a mixture of isopropanol and water.

Compounds described above as the solvent (C) may be used as mixtures. Usable are, for instance, mixtures of at least one compound selected from the group consisting of linear hydrofluorocarbons represented by the formula of $C_5H_2F_{10}$, etc., hydrofluoroethers represented by the formulae of $C_4F_9OCH_3$ and $C_4F_9OC_2H_5$, etc., and cyclic hydrofluorocarbons represented by the formula of $C_5H_3F_7$, etc. and alcohols having 3 or 4 carbon atoms. Two types of alcohols may be selected from the alcohols having 3 or 4 carbon atoms.

Taking a two-step treatment for an example, preferred combinations of the nonaqueous solvents (B) used in the first step and the solvents (C) used in the second step will be given below, though these are not intended to be limited to the two-step treatment. The combinations of nonaqueous solvents (B)/solvents (C) are, for instance, ether/hydrofluoroether, ether/cyclic hydrofluorocarbon, ether/alcohol, ether/mixture of alcohol and water, n-paraffin/hydrofluoroether, n-paraffin/cyclic hydrofluorocarbon, n-paraffin/alcohol, n-paraffin/mixture of alcohol and water, isoparaffin/hydrofluoroether, isoparaffin/cyclic hydrofluorocarbon, isoparaffin/alcohol, isoparaffin/mixture of alcohol and water, cycloparaffin/hydrofluoroether, cycloparaffin/cyclic hydrofluorocarbon, cycloparaffin/alcohol, cycloparaffin/mixture of alcohol and water, ketone/hydrofluoroether, ketone/cyclic hydrofluorocarbon, ketone/alcohol, and ketone/mixture of alcohol and water. With such combinations, the removal of the solvent (A) can effectively be carried out.

The amount of the solvent (C) used is preferably 50 to 200 parts by weight, per 100 parts by weight of the nonaqueous solvent (B) used.

The washing may be carried out by a method of extracting by immersion in the solvent (C), a method of spraying the solvent (C), or combinations thereof. The washing is preferably carried out at a temperature of 20 to 80° C.

(d) Drying of Membrane

The membrane obtained by stretching and solvent removal may be dried by a heat-drying method or an air-drying method, etc. The drying is preferably carried out at a temperature equal to or lower than the crystalline dispersion temperature of the thermoplastic resin, particularly at a temperature lower than the crystalline dispersion temperature by 5° C. or more.

The content of the nonaqueous solvent (B) remaining in the microporous thermoplastic resin membrane is reduced to preferably 5% by weight or less, more preferably 3% by weight or less, based on the weight (100% by weight) of the dried membrane by the drying treatment. When the drying is so insufficient that a large amount of the nonaqueous solvent (B) remains in the membrane, the porosity of the membrane is undesirably reduced in a subsequent heat treatment, resulting in the deterioration of permeability.

(e) Cross-Linking Treatment of Membrane

After drying the membrane obtained by stretching and solvent removal by a heat drying method, an air-drying method, etc., the membrane is preferably subjected to a cross-linking treatment by the irradiation of ionized rays. α-Rays, β-rays, γ-rays, electron rays, etc. may be used as the ionizing rays and electron rays may be irradiated in a dose of 0.1 to 100 Mrad at accelerating voltage of 100 to 300 kV. This treatment can improve the melt-down temperature.

(f) Heat Treatment

A heat treatment may be carried out after drying. The heat treatment stabilizes crystals, resulting in uniform lamella layers. The heat treatment may be any of a heat-stretching treatment, a heat-setting treatment and a heat-shrinking treatment. These treatments are carried out at a temperature equal to or lower than the melting point of the microporous thermoplastic resin membrane, preferably at a temperature between 60° C. and (melting point −10° C.).

The heat-stretching treatment may be carried out by any usual method such as a tenter method, a roll method or a rolling method, the stretching magnification being preferably 1.01 to 2.0 times, more preferably 1.01 to 1.5 times, in at least one direction.

The heat-setting treatment may be conducted by any of a tenter method, a roll method and a rolling method. The heat-shrinking treatment may be carried out by a tenter method, a roll method or a rolling method, or by a belt conveyor method or a floating method. The heat-shrinking treatment is preferably in a range of 50% or less, more preferably in a range of 30% or less, in at least one direction.

The above-described heat-stretching treatment, heat-setting treatment and heat-shrinking treatment may be combined in large numbers. Particularly the heat-shrinking treatment after the heat-stretching treatment is preferable because it provides a low-shrinkage, high-strength microporous membrane.

(g) Treatment for Providing Hydrophilic Properties

The resultant microporous membrane may be provided with hydrophilic properties. A treatment for providing the membrane with hydrophilic properties may be monomer grafting, a surfactant treatment, a corona discharge treatment, etc. The treatment for providing the membrane with hydrophilic properties is preferably carried out after the irradiation of ionizing rays.

When a surfactant is used, it may be any of a nonionic surfactant, a cationic surfactant, an anionic surfactant and an amphoteric surfactant, and the nonionic surfactant is preferable. The surfactant in the form of an aqueous solution, or a solution of a lower alcohol such as methanol, ethanol or isopropanol, etc., is applied to the membrane by a dipping method, and a doctor blade method, etc. to provide it with hydrophilic properties.

The resultant hydrophilic microporous membrane is dried. To improve permeability, the drying is preferably conducted by a heat treatment at a temperature equal to or lower than the melting point of the microporous thermoplastic resin membrane while preventing shrinkage or stretching.

[3] Microporous Thermoplastic Resin Membrane

The microporous thermoplastic resin membrane thus produced usually has a porosity of 25 to 70% and a permeability of 10 to 2000 second/100 cc. Though the thickness of the microporous thermoplastic resin membrane may be selected depending on its applications, it is preferably 5-200 μm when it is used as a battery separator. Because the microporous membrane of the present invention exhibits excellent permeability, it may suitably be used for battery separators, filters, etc.

The present invention will be explained in more detail with reference to Examples below without intention of restricting the scope of the present invention.

EXAMPLE 1

100 parts by weight of a composition consisting of 20% by weight of ultra-high-molecular-weight polyethylene (UHMWPE) having a weight-average molecular weight of $2.0 \times 10^6$ and 80% by weight of high-density polyethylene (HDPE) having a weight-average molecular weight of $3.5 \times 10^5$, which had Mw/Mn of 16.8, a melting point of 135° C. and a crystalline dispersion temperature of 90° C., was mixed with 0.375 parts by weight of tetrakis[methylene-3-(3,5-ditertiary-butyl-4-hydroxyphenyl)-propionate]methane as an antioxidant, to prepare a polyethylene composition. 30 parts by weight of the resultant polyethylene composition was supplied to a strong-kneading-type, double-screw extruder (internal diameter=58 mm, L/D=42). 70 parts by weight of liquid paraffin was introduced into the double-screw extruder through the side-feeder. The resultant mixture was melt-blended at 200° C. and 200 rpm in the extruder to prepare a polyethylene solution. Subsequently, this polyethylene solution was extruded through a T-die installed at a tip end of the extruder such that a biaxially oriented membrane became as thick as about 50 μm, and drawn by a cooling roll controlled at 50° C., to form a gel-like sheet. The resultant gel-like sheet was biaxially stretched to 5×5 times by a batch-orientating machine at 118° C. to form a stretched membrane. The resultant membrane was set in an aluminum frame of 20 cm×20 cm, and immersed in a first washing bath containing glycol ether acetate (3-methoxy-3-methylbutyl acetate) having a boiling point of 188° C. and a flash point of 75° C. and controlled at 50° C., which is hereinafter referred to as Ester (1), and washed with vibration at 100 rpm for 3 minutes. It was further immersed for 1 minute in a second washing bath (rinsing bath) containing a hydrofluoroether of $C_4F_9OCH_3$ having a boiling point of 61° C. and no flash point ("HFE-7100," available from Sumitomo 3M Limited) controlled at 50° C. for a rinsing treatment. After the rinsing treatment, the membrane was spontaneously dried and further heat-set at 120° C. for 10 minutes to produce a microporous polyethylene membrane.

EXAMPLE 2

A microporous polyethylene membrane was produced in the same manner as in Example 1 except for conducing a rinsing treatment by immersing a membrane set in an aluminum frame in a rinsing bath containing isopropanol having a boiling point of 82° C. controlled at 40° C. for 1 minute.

EXAMPLE 3

A microporous polyethylene membrane was produced in the same manner as in Example 1 except for conducing a rinsing treatment by immersing a membrane set in an aluminum frame in a rinsing bath containing a 87-%-by-weight aqueous solution of isopropanol having a boiling point of 80° C. controlled at 60° C. for 1 minute.

EXAMPLE 4

A microporous polyethylene membrane was produced in the same manner as in Example 1 except for conducing a rinsing treatment by immersing a membrane set in an aluminum frame for 1 minute in a first washing bath containing an isoparaffin hydrocarbon detergent [$C_9$ component/$C_{10}$ component/$C_{11}$ component=1/36/50 parts by weight, the balance being components having carbon atoms in other numbers, boiling point=154 to 174° C., flash point=41° C., hereinafter referred to as Isoparaffin (1)] controlled at 50° C.

EXAMPLE 5

A microporous polyethylene membrane was produced in the same manner as in Example 1, except that a membrane set in an aluminum frame was immersed in a first washing bath containing an isoparaffin hydrocarbon detergent ($C_8$ component/$C_9$ component/$C_{10}$ component=51/27/18 parts by weight, the balance being components having carbon atoms in other numbers, boiling point=118 to 140° C., flash point=7° C., hereinafter referred to as Isoparaffin (2)] at room temperature for 1 minute without a rinsing treatment and dried by hot air at 70 to 80° C.

EXAMPLE 6

A microporous polyethylene membrane was produced in the same manner as in Example 1, except that a membrane set in an aluminum frame was washed twice in a first washing bath containing 3-methoxy butanol having a boiling point 160° C. and a flash point of 65° C. controlled at 50° C., immersed in a rinsing bath of water controlled at 50° C. for one minute to carry out a rinsing treatment twice, and then dried by hot air at 70 to 80° C.

EXAMPLE 7

A microporous polyethylene membrane was produced in the same manner as in Example 1 except for drying a membrane set in an aluminum frame by blowing air thereonto without a rinsing treatment with HFE-7100.

EXAMPLE 8

A microporous polyethylene membrane was produced in the same manner as in Example 4 except for carrying out no rinsing treatment with HFE-7100.

EXAMPLE 9

A microporous polyethylene membrane was produced in the same manner as in Example 5 except for spontaneously drying a membrane set in an aluminum frame without drying by hot air at 70 to 80° C.

EXAMPLE 10

100 parts by weight of ultra-high-molecular-weight polyethylene having a weight-average molecular weight of $3.0 \times 10^6$ (UHMWPE, melting point=135° C., crystalline dispersion temperature=90° C.) was mixed with 0.375 parts by weight of tetrakis[methylene 3-(3,5-ditertiary-butyl-4-hydroxyphenyl) propionate] methane as an antioxidant. 17 parts by weight of the resultant polyethylene composition was supplied to a strong-kneading-type, double-screw extruder (internal diameter=58 mm, L/D=42). 18 parts by weight of fine silica powder, 50 parts by weight of dioctyl phthalate and 15 parts by weight of liquid paraffin were supplied to this biaxial extruder via a side feeder. The resultant mixture was melt-blended at 200° C. and 200 rpm in the extruder to prepare a polyethylene solution. This polyethylene solution was extruded through a T-die installed at a tip end of the extruder such that the resultant membrane was as thick as about 200 μm, drawn by a cooling roll controlled at 50° C. to form a gel-like sheet.

The resultant gel-like sheet was set in an aluminum frame of 20 cm×20 cm, immersed in a first washing bath of Ester (1) controlled at 50° C., and vibrated at 100 rpm for 3 minutes to extract dioctyl phthalate and liquid paraffin. It was then immersed in a rinsing bath of HFE-7100 controlled at 50° C. for one minute to carry out a rinsing treatment, and the resultant membrane was dried. The dried membrane was immersed in a washing bath containing a 25-% sodium hydroxide solution controlled at 60° C. for 10 minutes to extract fine silica powder, and then spontaneously dried. This membrane was monoaxially stretched to a thickness of about 30 μm by a batch-stretching machine heated at 125° C., and heat-set at 115° C. for 10 minutes.

EXAMPLE 11

A microporous polyethylene membrane was produced in the same manner as in Example 1, except that the membrane was washed by immersion for 3 minutes in a first washing bath containing a mixture solution of Ester (1) having a boiling point 188° C. and a flash point of 75° C. and HFE-7100 having a boiling point of 61° C. and no flash point at a weight ratio of 50/50, which was controlled at 40° C., and then immersed in a rinsing bath of HFE-7100 at room temperature for 1 minute to carry out a rinsing treatment.

EXAMPLE 12

A microporous polyethylene membrane was produced in the same manner as in Example 1, except that a membrane set in an aluminum frame was washed by immersion for 3 minutes in a first washing bath containing a mixture solution of Isoparaffin (1) having a boiling point of 154 to 174° C. and a flash point of 41° C. and a cyclic hydrofluorocarbon of $C_5H_3F_7$ having a boiling point of 80° C. and no flash point ("Zeorora-H," available from Zeon Corporation) at a weight ratio 50/50, which was controlled at 60° C., and then immersed in a rinsing bath of Zeorora-H at 80° C. for 1 minute to carry out a rinsing treatment.

EXAMPLE 13

A microporous polyethylene membrane was produced in the same manner as in Example 1, except that a membrane set in an aluminum frame was washed by immersion for 3 minutes in a first washing bath containing a mixture solution of propylene glycol n-butyl ether having a boiling point of 170°

C. and a flash point of 62° C. and HFE-7100 having a boiling point of 61° C. and no flash point at a weight ratio of 95/5, which was controlled at 50° C., and then immersed in a rinsing bath of HFE-7100 at room temperature for 1 minute to carry out a rinsing treatment.

EXAMPLE 14

A microporous polyethylene membrane was produced in the same manner as in Example 1, except that a membrane set in an aluminum frame was washed by immersion for 3 minutes in a first washing bath containing a mixture solution of dipropylene glycol dimethylether having a boiling point of 175° C. and a flash point of 60° C. and HFE-7100 having a boiling point 61° C. and no flash point at a weight ratio of 95/5, which was controlled at 50° C., and then immersed in a rinsing bath of HFE-7100 at room temperature for 1 minute rinsing treatment.

COMPARATIVE EXAMPLE 1

A microporous polyethylene membrane was produced in the same manner as in Example 1, except that a membrane set in an aluminum frame was washed in a first washing bath containing a 4-% aqueous solution of sodium alkylbenzene sulfonate controlled at 50° C., immersed in a rinsing bath of water controlled at 50° C. for 1 minute to carry out a rinsing treatment, and then dried by hot air at 70 to 80° C.

COMPARATIVE EXAMPLE 2

A microporous polyethylene membrane was produced in the same manner as in Example 1, except that a membrane set in an aluminum frame was washed in a first washing bath containing an 87-%-by-weight aqueous solution of N-methyl-2-pyrrolidone controlled at 50° C., immersed in a rinsing bath of water controlled at 50° C. for 1 minute to carry out a rinsing treatment, and then dried by hot air at 70 to 80° C.

COMPARATIVE EXAMPLE 3

A microporous polyethylene membrane was produced in the same manner as in Example 10, except that a membrane set in an aluminum frame was washed in a first washing bath containing a 4-% aqueous solution of sodium alkylbenzene sulfonate controlled at 50° C., immersed in a rinsing bath of water controlled at 50° C. for 1 minute to carry out a rinsing treatment, and then dried by hot air at 70 to 80° C.

COMPARATIVE EXAMPLE 4

A microporous polyethylene membrane was produced in the same manner as in Example 11, except that a membrane set in an aluminum frame was washed in a first washing bath containing a 4-% aqueous solution of sodium alkylbenzene sulfonate controlled at 50° C., immersed in a rinsing bath of water controlled at 50° C. for 1 minute to carry out a rinsing treatment, and then dried by hot air at 70 to 80° C.

Evaluation of Properties

The properties of the microporous thermoplastic resin membranes obtained in Examples 1 to 14 and Comparative Examples 1 to 4 were measured by the following methods, and their results are shown in Table 1.

(1) Thickness of membrane
Measured by a scanning electron microscope.
(2) Air permeability
Measured according to JIS P8117.
(3) Porosity
Measured by a weight method.
(4) Residue A sample of 95 mm×95 mm was punched out from each microporous membrane to measure its weight. The weight at this time was $W_A$. Each sample was subjected to an ultrasonic extraction treatment in 300 ml of methylene chloride for 10 minutes, and the sample after extraction was dried at 105° C. for 5 minutes, to measure its weight again. The weight at this time was $W_B$. The percentage X (% by weight) of a residue was calculated by $X=(W_A-W_B)/W_A \times 100$. The residue was mostly liquid paraffin, containing small amounts of other components such as the antioxidant, dioctyl phthalate, fine silica powder, the nonaqueous solvent (B) and/or (C), etc.

TABLE 1

| | Thickness (μm) | Permeability (sec/100 cc) | Porosity (volume %) | Residue (weight %) |
|---|---|---|---|---|
| Ex. 1 | 37 | 420 | 48 | 1.8 |
| Ex. 2 | 33 | 510 | 43 | 0.8 |
| Ex. 3 | 34 | 520 | 44 | 0.8 |
| Ex. 4 | 38 | 400 | 50 | 1.9 |
| Ex. 5 | 33 | 550 | 43 | 2.7 |
| Ex. 6 | 34 | 500 | 45 | 1.3 |
| Ex. 7 | 30 | 930 | 35 | 2.8 |
| Ex. 8 | 35 | 1,070 | 37 | 3.3 |
| Ex. 9 | 41 | 630 | 50 | 3.4 |
| Ex. 10 | 29 | 190 | 70 | 2.4 |
| Ex. 11 | 35 | 488 | 44 | 2.3 |
| Ex. 11 | 41 | 343 | 54 | 1.3 |
| Ex. 13 | 36 | 390 | 48 | 2.5 |
| Ex. 11 | 36 | 380 | 49 | 1.7 |
| Com. Ex. 1 | 39 | 69,150 | 5 | 50.0 |
| Com. Ex. 2 | 56 | 82,720 | 1 | 66.0 |
| Com. Ex. 3 | 34 | 67,250 | 3 | 77.0 |
| Com. Ex. 4 | 40 | 8,920 | 23 | 74.0 |

As is clear from Table 1, the microporous thermoplastic resin membranes of Examples 1 to 14 produced by the method of the present invention were sufficiently deprived of liquid paraffin, exhibiting excellent permeability. On the other hand, because the microporous membranes of Comparative Examples 1 to 4 were produced using an aqueous detergent or a semi-aqueous detergent, liquid paraffin was not fully removed, failing to obtain sufficient properties.

Because the production of the microporous thermoplastic resin membrane by the wet method of the present invention uses a nonaqueous solvent (B) having a boiling point of 100° C. or higher and a flash point of 0° C. or higher in the step of removing a solvent (A) after the melt-blending of a thermoplastic resin and the solvent (A), the microporous thermoplastic resin membrane can be produced efficiently with reduced possibility of environmental pollution. Furthermore, because the nonaqueous solvent (B) has a high boiling point, it is easily condensed and thus recovered, resulting in easy recycling. The resultant microporous thermoplastic resin membrane has excellent properties, useful for battery separators, filters, etc.

What is claimed is:

1. A method for producing a microporous thermoplastic resin membrane consisting essentially of the steps of extruding a solution obtained by melt-blending a thermoplastic resin and a solvent (A), cooling the resultant extrudate to form a gel-like product, stretching said gel-like product to form a stretched membrane having oriented molecular chains, and cleansing said stretched membrane to remove said solvent (A) remaining therein, wherein said solvent (A) is removed by two or more cleansing steps, at least one step among the cleansing steps using a nonaqueous solvent (B) in an amount of 300 to 30,000 parts by weight per 100 parts by weight of said gel-like molding, and a solvent (C) causing no depletion of an ozone layer and having a boiling point of 100° C. or lower being used at a final step, and wherein said solvent (C) is (a) hydrofluoroethers, or (b) a mixture of hydrofluoroethers and an alcohol having 3 or 4 carbon atoms, wherein said stretching is biaxial stretching and said biaxial stretching is simultaneous or sequential stretching in longitudinal and transverse directions, wherein said stretching is carried out at a temperature in a range between the crystalline dispersion temperature and under the crystalline melting point of said gel-like product, and wherein said stretching temperature is 110° C. to 120° C., wherein in the at least one step among the cleansing steps using the non-aqueous solvent (B) and in the final step using solvent (C), both non-aqueous solvent (B) and solvent (C) different from each other, wherein in the at least one step using the non-aqueous solvent (B) and in the final step using solvent (C), both solvent (B) and solvent (C) are not used together in the at least one step and the final step.

2. The method for producing a microporous thermoplastic resin according to claim 1, wherein said nonaqueous solvent (B) is at least one selected from the group consisting of paraffinic hydrocarbons, aromatic hydrocarbons, alcohols, esters, ethers and ketones.

3. The method for producing a microporous thermoplastic resin according to claim 1, wherein said nonaqueous solvent (B) contains at least one solvent selected from the group consisting of linear hydrofluorocarbons, hydrofluoroethers and cyclic hydrofluorocarbons as a component (B').

4. The method for producing a microporous thermoplastic resin according to claim 3, wherein said linear hydrofluorocarbon is represented by the formula $C_5H_2F_{10}$, said hydrofluoroether is represented by the formula $C_4F_9OCH_3$ or $C_4F_9OC_2H_5$, and said cyclic hydrofluorocarbon is represented by the formula $C_5H_3F_7$.

5. The method for producing a microporous thermoplastic resin according to claim 1, wherein said hydrofluoroether is represented by the formula $C_4F_9OCH_3$ or $C_4F_9OC_2H_5$.

6. The method for producing a microporous thermoplastic resin according to claim 1, wherein said solvent (A) is removed before and/or after stretching said gel-like product.

7. The method for forming a microporous thermoplastic resin membrane according to claim 5, wherein said microporous thermoplastic resin membrane has a thickness of 29-48 μm, a permeability of 190-1,070 sec/100 cc and a porosity of 35-70 volume % with a residue of 0.8-2.7 weight %.

8. The method for forming a microporous thermoplastic resin membrane according to claim 5, wherein said thermoplastic resin is a polyolefin which has a weight-average molecular weight of $5 \times 10^5$ or more.

9. The method for forming a microporous thermoplastic resin membrane according to claim 5, wherein said thermoplastic resin is a composition comprising ultra-high-molecular-weight polyethylene having a weight-average molecular weight of $5 \times 10^5$ or more and high density polyethylene having a weight-average molecular weight of $1 \times 10^4$ or more and less than $5 \times 10^5$.

10. The method for producing a microporous thermoplastic resin according to claim 5, wherein said composition has a ratio of weight-average molecular weight/number-average molecular weight (Mw/Mn) of 5 to 300.

11. The method for producing a microporous thermoplastic resin membrane according to claim 1, wherein said alcohol having 3 or 4 carbon atoms in said mixture contained in said solvent (C) is at least one selected from the group consisting of n-propanol, isopropanol, s-butanol and t-butanol.

12. The method for producing a microporous thermoplastic resin membrane according to claim 1, wherein said microporous thermoplastic resin membrane has a thickness of 29-48 μm, a permeability of 190-1,070 sec/100 cc and a porosity of 35-70 volume % with a residue of 0.8-2.7 weight %.

13. The method for producing a microporous thermoplastic resin according to claim 12, wherein said thermoplastic resin is at least one polyolefin selected from the group consisting of polyethylene, polypropylene and polybutene-1.

14. The method for producing a microporous thermoplastic resin according to claim 1, wherein said thermoplastic resin is selected from the group consisting of polyolefins, polyesters, polyamides and polyallylene sulfides.

15. The method for producing a microporous thermoplastic resin according to claim 1, wherein the stretching magnification in said biaxial stretching is at least twice or more in any direction and 10 times or more by area magnification.

16. The method for producing a microporous thermoplastic resin according to claim 1, wherein said stretching is carried out by a method of any one of a tenter method, a roll method, an inflation method, a rolling method or a combination thereof.

17. The method for producing a microporous thermoplastic resin according to claim 1, wherein biaxial stretching is at least twice or more in any direction and 10 times or more by area magnification.

18. The method for producing a microporous thermoplastic resin according to claim 1, wherein said cleansing step is carried out by a method of extracting by immersion in a nonaqueous solvent (B), a method of spraying a nonaqueous solvent (B), or a combination thereof.

* * * * *